United States Patent [19]
Holm

[11] Patent Number: 6,085,375
[45] Date of Patent: Jul. 11, 2000

[54] LIP GUIDING MECHANISM FOR DOCK LEVELERS

[75] Inventor: David Holm, Oak Creek, Wis.

[73] Assignee: Rite-Hite Holding Corporation, Milwaukee, Wis.

[21] Appl. No.: 09/102,313

[22] Filed: Jun. 22, 1998

[51] Int. Cl.[7] .................................................. E01D 1/00
[52] U.S. Cl. ............................................ 14/71.7; 14/71.3
[58] Field of Search ................................... 14/71.1, 71.3, 14/71.7

[56] References Cited

U.S. PATENT DOCUMENTS

| | | | |
|---|---|---|---|
| 3,117,332 | 1/1964 | Kelley et al. | 14/71.3 |
| 3,137,017 | 6/1964 | Pfleger et al. | 14/71 |
| 3,199,133 | 8/1965 | Ramer | 14/71.3 |
| 3,249,956 | 5/1966 | Zajac et al. | 14/71.3 |
| 3,323,158 | 6/1967 | Loomis | 14/71 |
| 3,475,778 | 11/1969 | Merrick et al. | 14/71.3 |
| 3,500,486 | 3/1970 | Le Clear | 14/71.3 |
| 3,662,416 | 5/1972 | Brooks et al. | 14/71.3 |
| 3,671,990 | 6/1972 | Hovestad | 14/71.3 |
| 3,728,753 | 4/1973 | Beckwith et al. | 14/71.3 |
| 3,786,530 | 1/1974 | Le Clear | 14/71 |
| 3,877,102 | 4/1975 | Artzberger | 14/71 |
| 3,902,213 | 9/1975 | Pfleger et al. | 14/71 |
| 3,921,241 | 11/1975 | Smith | 14/71 |
| 3,995,342 | 12/1976 | Wiener | 14/71.3 |
| 4,010,505 | 3/1977 | Bouman | 14/71.3 |
| 4,279,050 | 7/1981 | Abbott | 14/71.3 |
| 4,325,155 | 4/1982 | Alten | 14/71.1 |
| 4,364,137 | 12/1982 | Hahn | 14/71.3 |
| 4,619,008 | 10/1986 | Kovach et al. | 14/71.7 |
| 4,662,021 | 5/1987 | Hagen et al. | 14/71.3 |
| 4,944,062 | 7/1990 | Walker | 14/71.3 |
| 4,974,276 | 12/1990 | Alexander | 14/71.3 |
| 5,040,258 | 8/1991 | Hahn et al. | 14/71.3 |
| 5,123,135 | 6/1992 | Cook et al. | 14/71.3 |
| 5,311,628 | 5/1994 | Springer et al. | 14/71.1 |
| 5,323,503 | 6/1994 | Springer | 14/71.3 |
| 5,416,941 | 5/1995 | Hageman | 14/71.7 |
| 5,440,772 | 8/1995 | Springer et al. | 14/69.5 |
| 5,475,888 | 12/1995 | Massey | 14/69.5 |
| 5,526,545 | 6/1996 | Alexander | 14/71.3 |
| 5,553,343 | 9/1996 | Alexander | 14/71.3 |
| 5,586,356 | 12/1996 | Alexander | 14/71.3 |
| 5,813,072 | 9/1998 | Alexander | 14/71.1 |

*Primary Examiner*—Thomas B. Will
*Assistant Examiner*—Kristine M. Markovich
*Attorney, Agent, or Firm*—Marshall, O'Toole, Gerstein, Murray & Borun

[57] ABSTRACT

A lip guiding mechanism is disclosed for use with a dock leveler having a deck which is pivotally movable with respect to a loading dock, a lip which is pivotally attached to a front of the deck, and a lip keeper which is positioned to receive the lip when the deck is in a cross-traffic position and the lip is in a pendant position. In use, the lip-guiding mechanism selectively deflects the lip of the dock leveler away from the lip keeper to facilitate below dock level end-loading conditions. The lip guiding mechanism includes a lip guide member with a camming surface. The lip guide member is disposable adjacent to the loading dock and is movable between a stored position, wherein the camming surface is positioned for clearance from the lip of the dock leveler, and an activated position, wherein the camming surface is positioned for engagement by the lip of the dock leveler. When the lip guide member is in the activated position, the camming surface deflects the lip of the dock leveler away from the lip keeper of the dock leveler to permit the deck to be lowered into a below dock level position. The lip guiding mechanism is also provided with an actuator for selectively moving the lip guide member between the stored and activated positions.

14 Claims, 16 Drawing Sheets

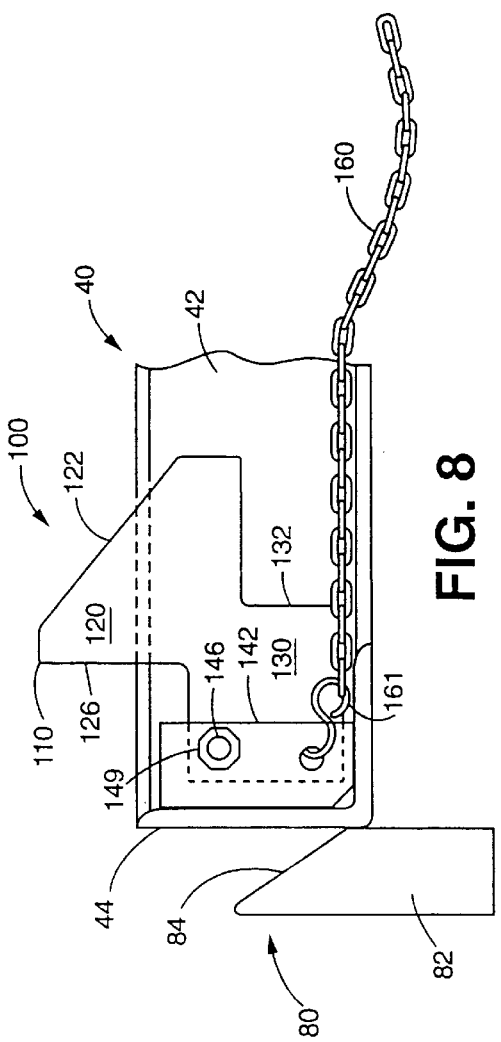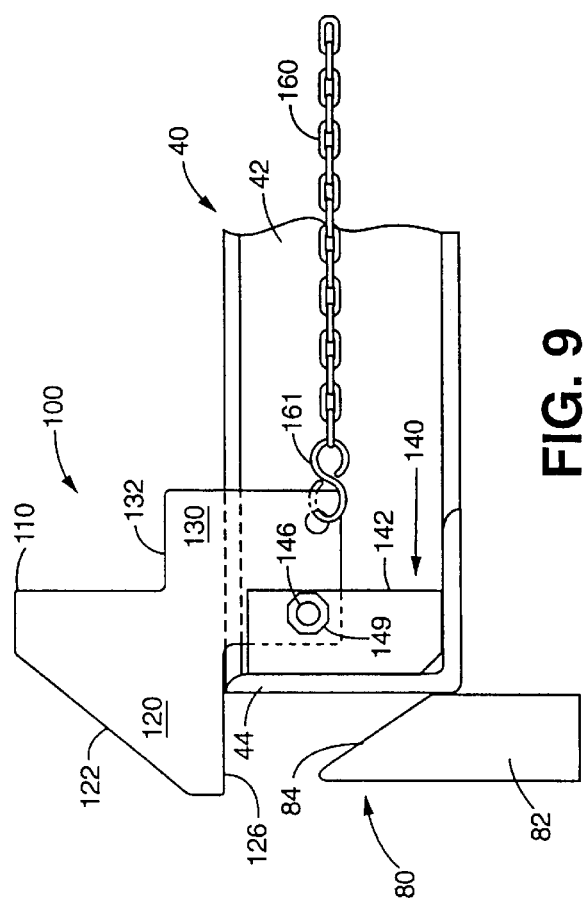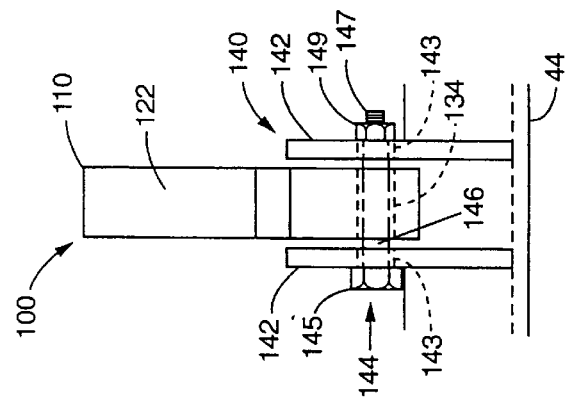

LIP GUIDING MECHANISM FOR DOCK LEVELERS

FIELD OF THE INVENTION

The present invention relates generally to dock levelers and, more particularly, to a lip guiding mechanism for dock levelers which expedites and improves the loading and unloading of vehicles by facilitating below dock level end-loading conditions.

BACKGROUND OF THE INVENTION

Dock levelers are commonly utilized to compensate for height differentials between the loading surface of a loading dock and the bed of a parked vehicle. In most instances, dock levelers are mounted within a recess or pit of the loading dock and are provided with a generally planar deck which is pivotally movable with respect to the loading surface of the loading dock. Dock levelers are also provided with a deck actuator which moves the deck between a plurality of operating positions including, for example, a raised position wherein a front header of the deck is inclined upwardly above the loading surface of the loading dock to facilitate the loading and unloading of vehicles having high beds, a cross-traffic position wherein the deck is substantially aligned with the loading surface of the loading dock, and a below dock level position wherein the front header of the deck is inclined downwardly beneath the loading surface of the loading dock to facilitate the loading and unloading of vehicles having low beds.

Basically, there are two categories of dock levelers: (1) biased-up or mechanical levelers; and (2) biased-down levelers. With biased-up levelers, one or more mechanical mechanisms, such as springs or other biasing members, are provided to bias the deck toward the raised position. Once in the raised position, the deck must then be walked down to a lowered position. A hold-down device, such as a ratchet and pawl arrangement, maintains the deck in this lowered position, against the biasing of the springs or other biasing members. With biased-down levelers, the deck is biased toward the lowered position by force of gravity. Thus, a powered actuator is required to raise the deck. Powered actuators may take the form of a hydraulic cylinder, an airbag, a linear actuator such as a screw-drive, or the like. With screw-drive actuators, a counter-balancing means is usually provided to make the deck easier to raise.

In order to span the gap which may exist between the deck of the dock leveler and the rear end of a parked vehicle and to provide a bridge between the loading dock and the vehicle, dock levelers are typically provided with an extension plate or lip which is hingedly attached to the front header of the deck. In operation, the lip moves between a pendant position wherein the lip is inclined downwardly with respect to the deck, and an extended position wherein the lip extends outwardly from the front header in a generally parallel manner with respect to the deck. In the extended position, the lip is adapted to rest upon and be supported by the bed of the parked vehicle and to provide a bridge between the loading dock and the vehicle.

There are a variety of mechanisms known in the art for actuating the lip of dock levelers. In hydraulic dock levelers, for example, an independent hydraulic cylinder from the one used to actuate the deck is employed to extend the lip. Alternatively, the powered upward or downward motion of the deck can also be utilized to extend the lip. In the case of using the upward motion of the deck to extend the lip, a snubbing cable is typically provided between a linkage carried on the deck and the frame for the dock leveler, as disclosed, for example, in U.S. Pat. No. 5,323,503 (Springer). The linkage, in turn, is connected to the lip. When the deck is raised upwardly toward the raised position, the snubbing cable is stretched, and the linkage is rotated to a position where the lip is extended. In the case of using the downward motion of the deck to extend the lip, a mechanical toggle mechanism is typically employed to extend the lip as the deck descends from the raised position by either force of gravity or by walking onto the deck, as disclosed, for example, in U.S. Pat. No. 5,475,888 (Massey). For this reason, such lips are commonly referred to as "walk-out lips".

When dock levelers are not in use, the deck is normally positioned in the cross-traffic position and the lip is normally positioned in the pendant position. In order to support the lip during periods of inactivity, dock levelers are typically provided with a lip keeper which receives and retains the lip when the deck is in the cross-traffic position and the lip is in the pendant position.

Before loading or unloading a parked vehicle, the deck is normally pivoted upwardly a sufficient amount so that the lip may exit the lip keeper and swing outwardly from the pendant position without contacting the rear end of the vehicle. Once the lip has cleared the vehicle and is in the extended position, the deck and the extended lip are then pivoted downwardly as a unit until the lip rests upon the bed of the parked vehicle and spans the gap between the deck of the dock leveler and the rear end of the vehicle. When the gap is eliminated in this manner, the vehicle may be safely loaded or unloaded with cargo, freight, or other material.

Dock levelers are also often used without the lip extended in so-called end-load situations. When a vehicle arrives at the loading dock, the cargo therein may extend all the way to the rear edge of the vehicle. Accordingly, there is no room on the bed of the vehicle for a conventional, extended lip. Similarly, when loading a trailer to full capacity, the last loads placed on the trailer will need to be positioned where the extended lip normally would rest. For both of these situations (referred to herein as "end-loads" or "end-loading") the dock leveler needs to be used without the lip being extended, i.e., remaining in or near its pendant position. If the trailer bed is either at or above dock level, the placement or removal of such end-loads can typically be done with the deck in the cross-traffic position. The forks of the forktruck are simply extended across the gap between the deck of the dock leveler and the rear end of the vehicle for the purpose of placing or removing the load. If the vehicle bed is above dock height, the forks can simply be raised up to that level, a feature provided on most forktrucks. If, however, the bed of a vehicle on which an end-load is going to be placed, or from which an end-load is going to be taken, is below dock level, the deck must be lowered to a below dock level position. Of course, the deck must be moved to this below dock level position without the lip being extended. Thus, when moving the deck from the cross-traffic position (with the lip stored in the lip keepers), the deck must first be raised to allow the lip to come out of the keepers, and then the lip must be partially extended so that it can avoid the lip keeper as the deck is subsequently rotated or lowered downwardly toward the below dock level position. Of course, the lip cannot extend a substantial distance, or else it would catch on the bed of the vehicle and interfere with the subsequent endloading operation. Thus, it is desirable in such a situation to have a mechanism that can extend the lip partially, so that it will miss the lip keeper as the deck moves downwardly.

In levelers with separate hydraulic actuation of the lip and the deck, partial lip extension can be achieved by actuating the lip cylinder momentarily. In mechanical (i.e., biased-up) levelers, or other levelers in which upward or downward deck motion is used for lip actuation, present means for achieving such partial lip movement is a push-bar mechanism, actuated by a manually-operated chain. The pulling of the chain by an operator causes a push-bar to engage against the back of the lip in order to rotate it slightly. While some mechanical advantage can be gained by utilizing a linkage between the pull-chain and the push-bar, a substantial force must nevertheless be exerted on the pull-chain to move the lip even this slight amount. A lip typically weighs approximately three-hundred (300) pounds and the necessary pull force on the pull-chain is thus approximately eighty (80) pounds. Of course, this force has to be maintained on the pull-chain until the tip of the lip has passed the lip keeper as the deck rotates down. In addition to requiring a significant pull force, the present pull-chain/push-bar arrangement is also expensive as a substantial push-bar and pull-chain, as well as a rugged linkage between the two, needs to be employed for the purpose of what typically amounts to only occasional need to move the deck to a below dock level position for end-loading.

OBJECTS OF THE INVENTION

Accordingly, a general object of the present invention is to provide a mechanism for a dock leveler which facilitates lip movement for below dock level end-loading conditions.

A more specific object of the present invention is to provide a lip guiding mechanism for a dock leveler which deflects the lip of the dock leveler away from the lip keeper of the dock leveler to facilitate below dock level end-loading conditions.

A related object of the present invention is to provide a lip guiding mechanism for a dock leveler which deflects the lip away from the lip keeper as the deck is moved toward a below dock level position.

A further related object of the present invention is to provide a lip guiding mechanism for a dock leveler which deflects the pendant or nearly-pendant lip away from the lip keeper as the deck is lowered below a cross-traffic position.

Another object of the present invention is to provide a lip guiding mechanism as characterized above which requires a relatively low actuation force to operate.

An additional object of the present invention is to provide a lip guiding mechanism having the foregoing characteristics which is reliable, durable, and convenient to use.

SUMMARY OF THE INVENTION

In accordance with these and other objects, a lip guiding mechanism is provided for a dock leveler having a deck which is pivotally movable with respect to a loading dock, a lip which is pivotally attached to a front of the deck, and a lip keeper which is positioned to receive the lip when the deck is in a cross-traffic position and the lip is in a pendant position. In use, the lip guiding mechanism selectively deflects the lip of the dock leveler away from the lip keeper to facilitate below dock level end-loading conditions.

The inventive lip guiding mechanism includes a lip guide member with a camming surface. The lip guide member is mounted adjacent to the loading dock and is movable between a stored position, wherein the camming surface of the lip guide member is positioned for clearance from the lip, and an activated position, wherein the camming surface of the lip guide member is positioned for engagement by the lip. When the lip guide member is in the activated position, the camming surface advantageously deflects the lip away from the lip keeper as the deck pivots downwardly from a raised position toward a below dock level position. The lip guiding mechanism also includes an actuator which selectively moves the lip guide member between the stored and activated positions.

These and other objects, features, and advantages of the present invention will become more readily apparent upon reading the following detailed description of the preferred embodiments, and upon reference to the accompanying drawings wherein:

BRIEF DESCRIPTION OF THE DRAWINGS

FIG. 8 is an enlarged side elevational view of the lip guiding mechanism depicted in FIG. 2;

FIG. 9 is an enlarged side elevational view of the lip guiding mechanism depicted in FIG. 4;

FIG. 10 is an enlarged front elevational view of the lip guiding mechanism depicted in FIG. 9;

Figure 11:
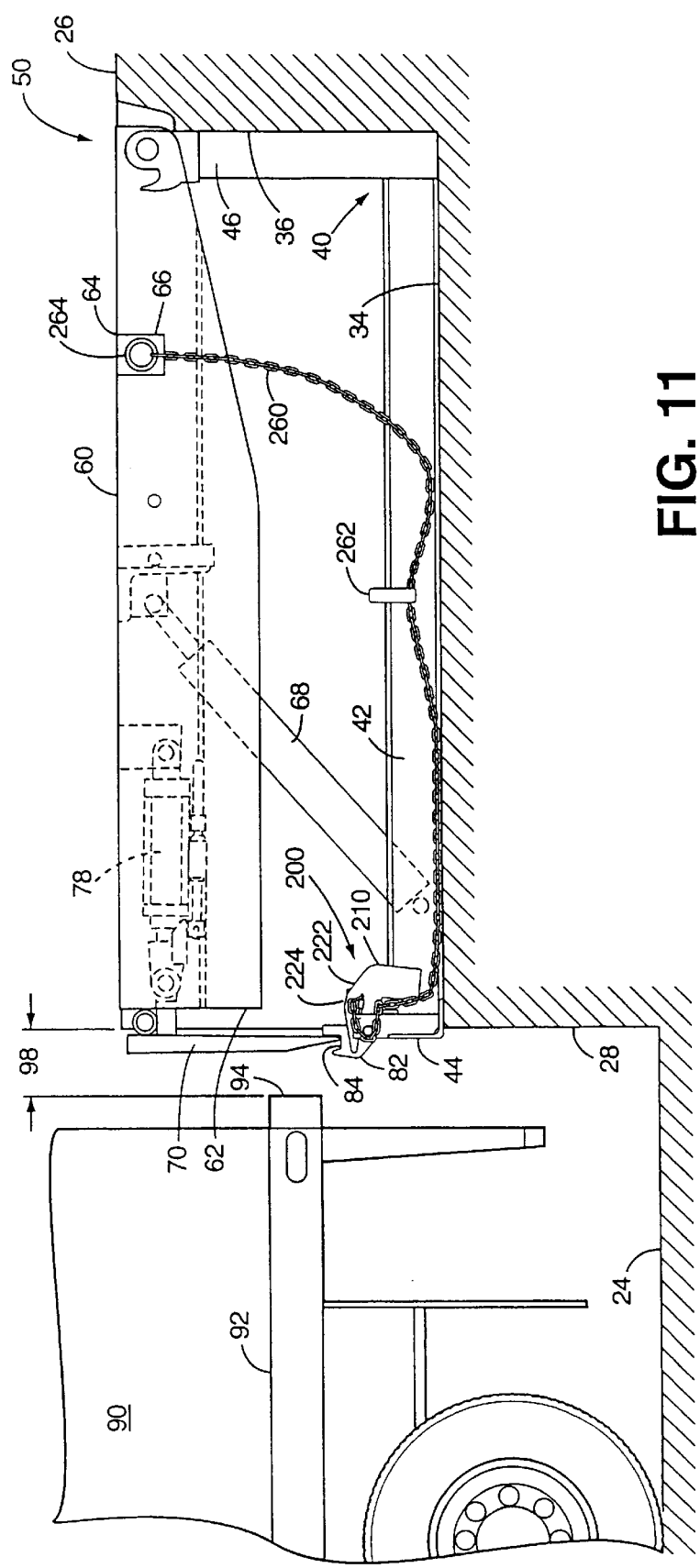
FIG. 11 is a side elevational view of the dock leveler depicted in FIG. 1 having an alternative embodiment of the lip guiding mechanism, and showing the deck of the dock leveler in a cross-traffic position, the lip of the dock leveler in a pendant position and received by the lip keeper, a lip guide member of the lip guiding mechanism in a stored position, and the rear end of a vehicle.
Figure 13:
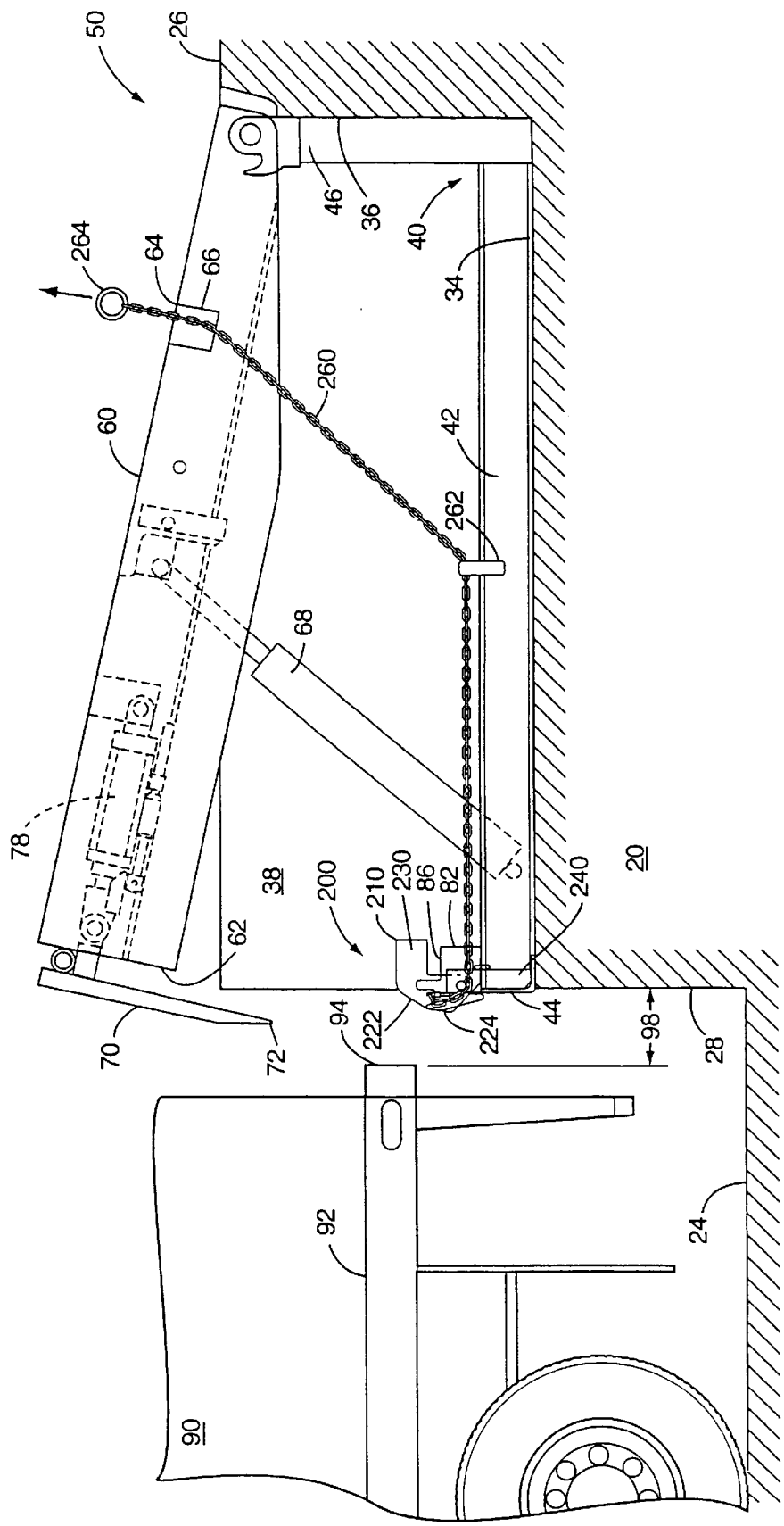
FIG. 13 is a side elevational view of the vehicle, the dock leveler, and the lip guiding mechanism depicted in FIGS. 11 and 12, showing the deck of the dock leveler in the raised position and the lip guide member of the lip guiding mechanism in an activated position.
Figure 14:
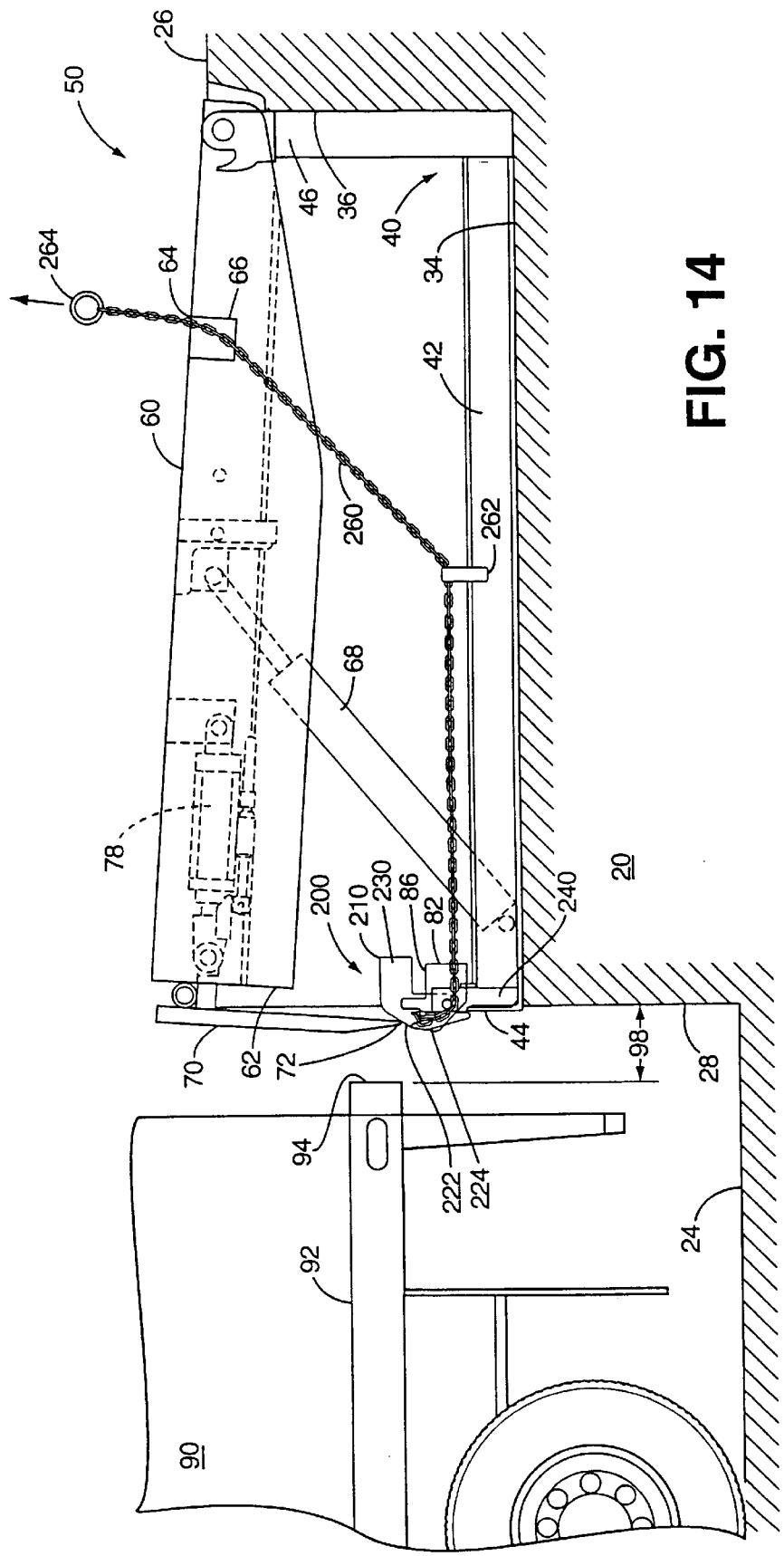
FIG. 14 is a side elevational view of the vehicle, the dock leveler, and the lip guiding mechanism depicted in FIGS.
Figure 15:
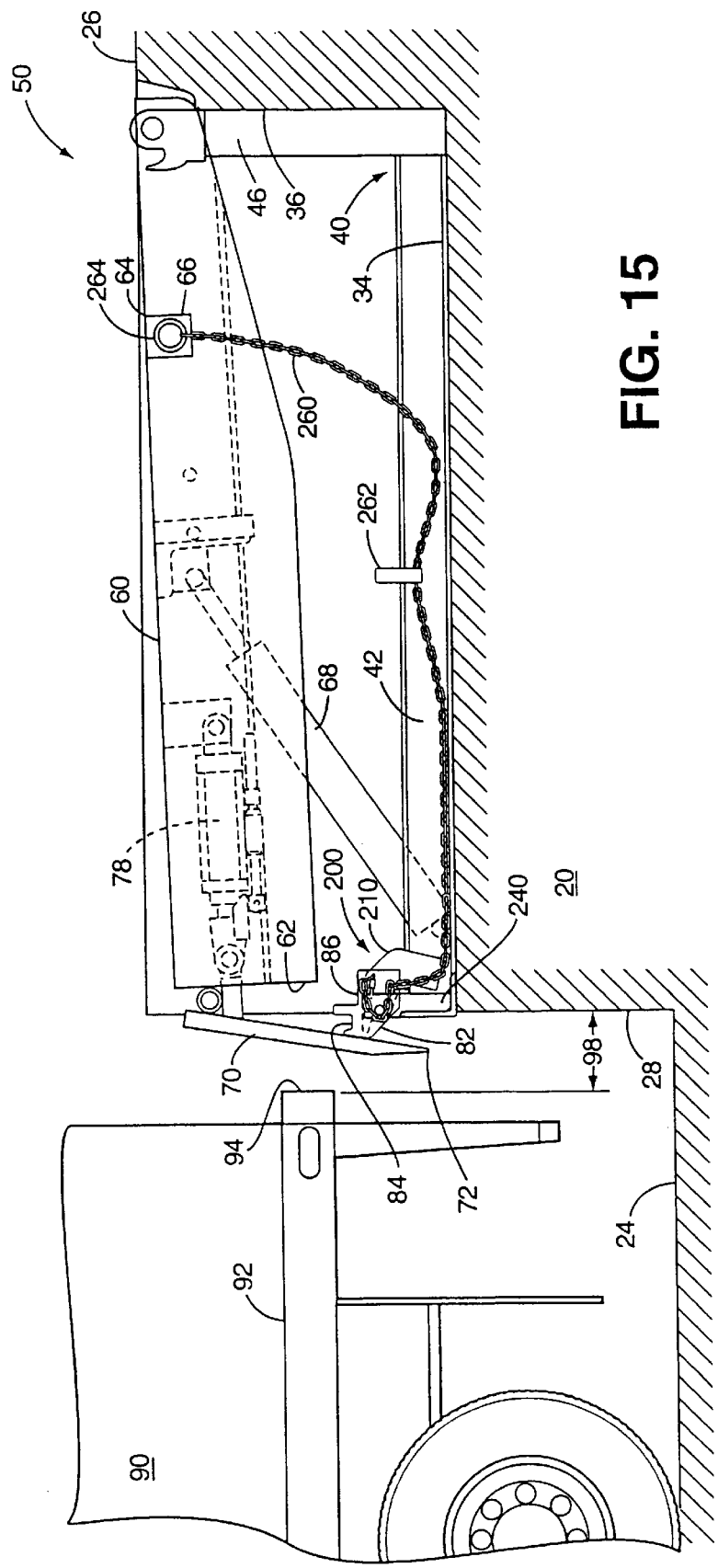
Figure 16:
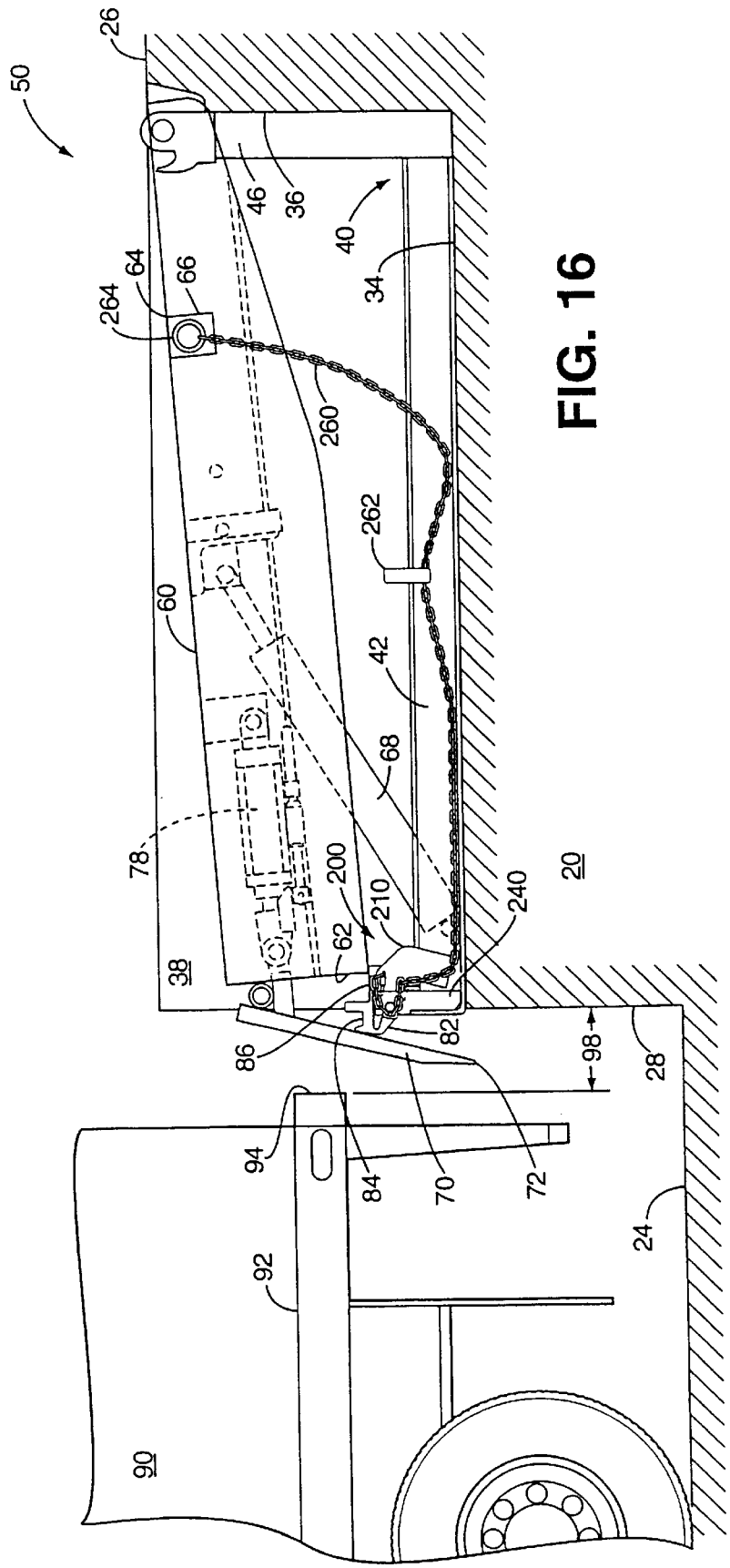
Figure 17:
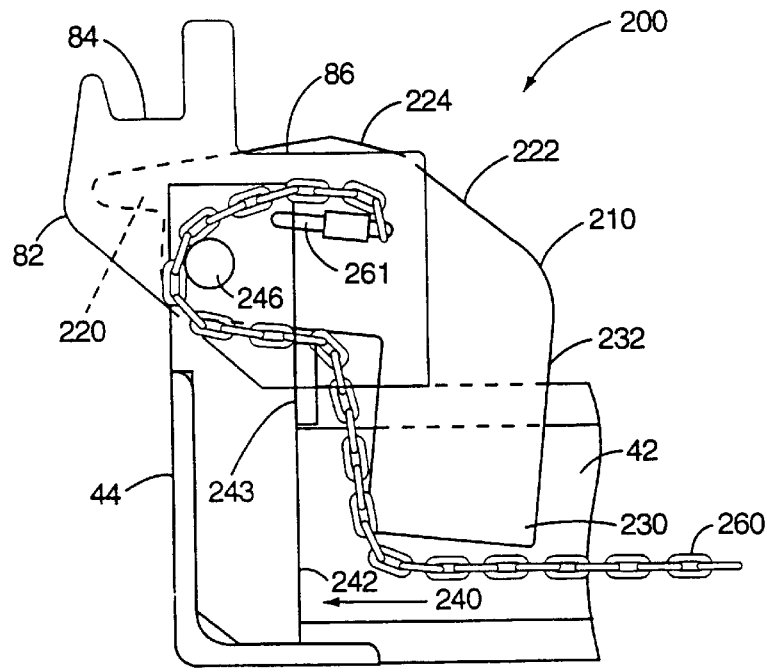
Figure 18:
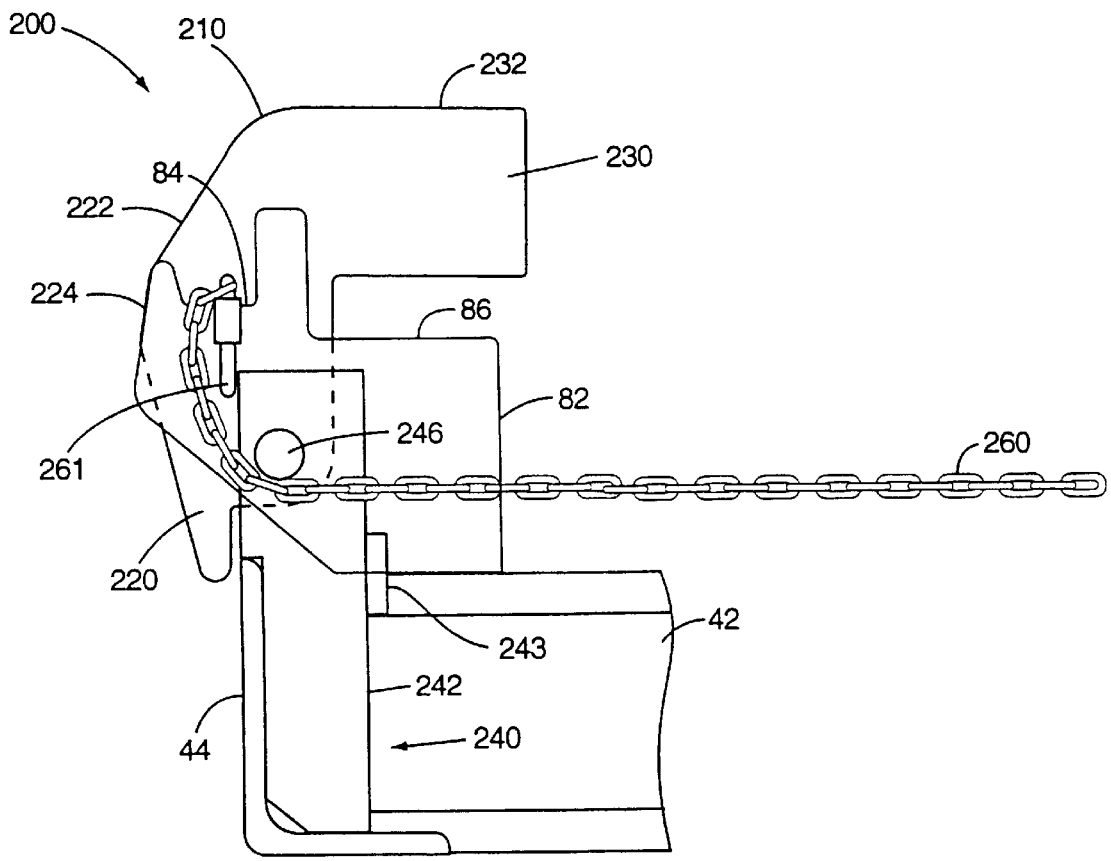
Figure 19:
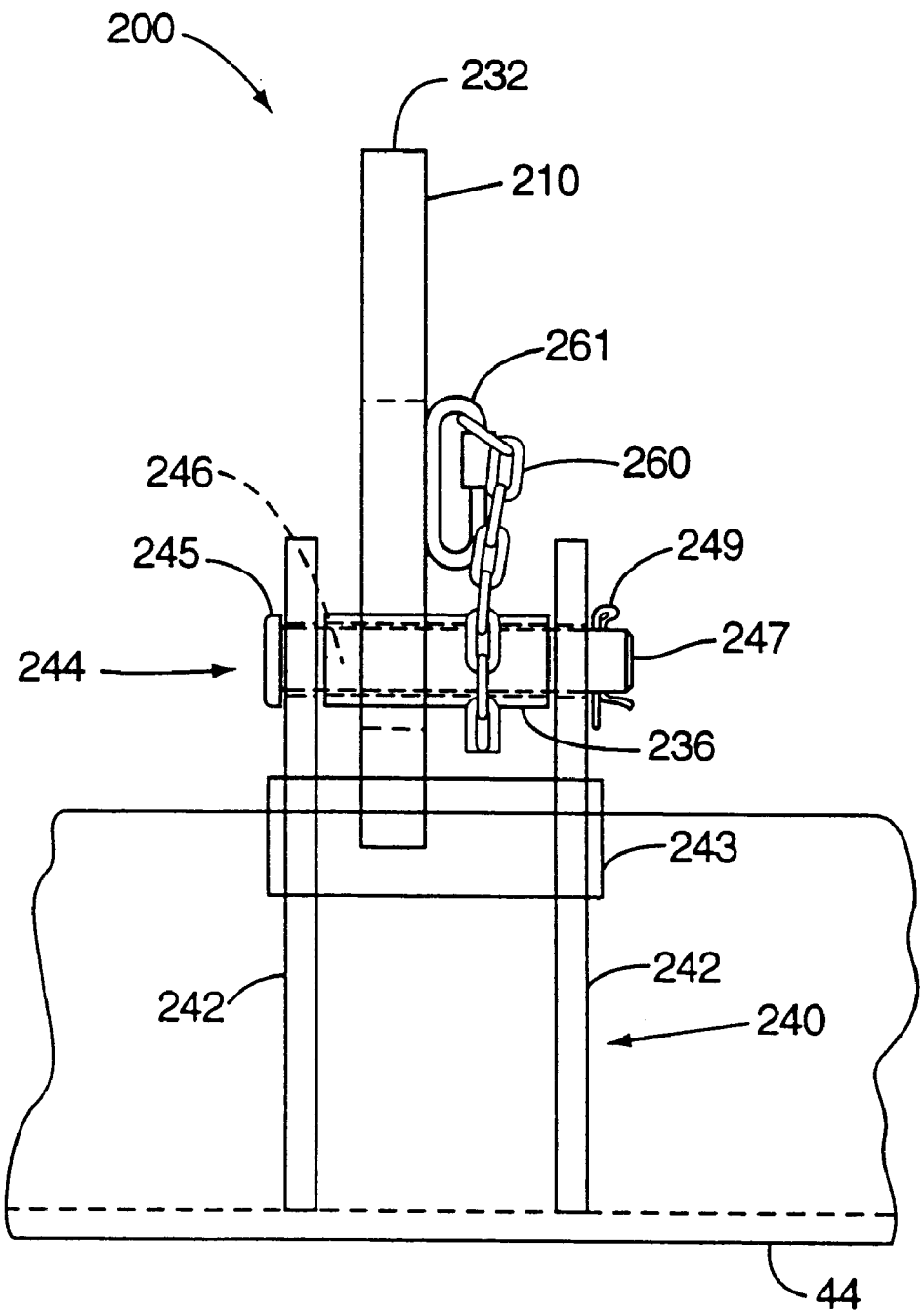

11–13, showing the lip guide member of the lip guiding mechanism deflecting the lip of the dock leveler away from the lip keeper as the deck descends from the raised position;

FIG. 15 is a side elevational view of the vehicle, the dock leveler, and the lip guiding mechanism depicted in FIGS. 11–14, showing the lip guide member of the lip guiding mechanism in the stored position and the deck of the dock leveler descending further away from the raised position;

FIG. 16 is a side elevational view of the vehicle, the dock leveler, and the lip guiding mechanism depicted in FIGS. 11–15, showing the deck of the dock leveler in a below dock level end-loading position;

FIG. 17 is an enlarged side elevational view of the lip guiding mechanism depicted in FIG. 11;

FIG. 18 is an enlarged side elevational view of the lip guiding mechanism depicted in FIG. 13; and FIG. 19 is an enlarged front elevational view of the lip guiding mechanism depicted in FIG. 18.

While the invention is susceptible to various modifications and alternative constructions, certain illustrated embodiments thereof have been shown in the drawings and will be described in detail below. It should be understood, however, that there is no intention to limit the present invention to the disclosed structural forms. On the contrary, the intention is to cover all modifications, alternative constructions, and equivalents that fall within the scope and spirit of the invention as defined by the appended claims.

DETAILED DESCRIPTION OF THE PREFERRED EMBODIMENTS

Turning now to the drawings, two embodiments of a lip guiding mechanism in accordance with the present invention are disclosed herein for use with a dock leveler 50. The first embodiment of the inventive lip guiding mechanism is designated by reference numeral 100, as shown in FIGS. 2–10, and the second embodiment of the inventive lip guiding mechanism is designated by reference numeral 200, as shown in FIGS. 11–19. In both embodiments, the dock leveler 50 is positioned within a recess or pit 30 of a loading dock 20.

As best shown in FIGS. 2–7 and 11–16, the loading dock 20 includes a roadway surface 24 which supports a parked vehicle 90, such as the trailer of a tractor-trailer. The loading dock 20 also includes a loading surface 26 which is elevated with respect to the roadway surface 24 and a front wall 28 which extends upwardly from the roadway surface 24 toward the loading surface 26. The recess 30 which accommodates the dock leveler 50 is formed in the front wall 28 of the loading dock 20 and extends inwardly away from the roadway surface 24. More specifically, the recess 30 is defined by a floor 34 which is disposed between the roadway surface 24 and the loading surface 26, a rear wall 36 which extends between the floor 34 and the loading surface 26, and a pair of spaced-apart side walls 38 which are disposed on either side of the rear wall 36 and, like the rear wall 36, extend between the floor 34 and the loading surface 26. In use, the dock leveler 50 compensates for height differentials between the loading surface 26 of the loading dock 20 and a bed or loading surface 92 of the parked vehicle 90.

A frame 40 is mounted within the recess 30 of the loading dock 20 to provide a supporting structure for the dock leveler 50. In the illustrated embodiment, the frame 40 includes a bottom section 42 which is fixedly attached to the floor 34 of the recess 30, a front section 44 which is fastened to the bottom section 42 in substantially adjacent relationship with respect to the front wall 28 of the loading dock 20, and a rear section 46 which extends upwardly from the bottom section 42 in substantially adjacent relationship with respect to the rear wall 36 of the recess 30.

The dock leveler 50 includes a generally planar deck 60 which is pivotally attached to the rear section 46 of the frame 40. The deck 60 also includes a front header 62 which, in the illustrated embodiment, extends downwardly from a front edge of the deck 60 in a substantially perpendicular manner. A deck actuator, such as hydraulic cylinder 68 or the like, is coupled to the bottom section 42 of the frame 40 and to an underside surface of the deck 60. In use, the deck actuator 68 selectively moves the deck 60 between a raised position, wherein the front header 62 of the deck 60 is inclined upwardly above the loading surface 26 of the loading dock 20, as shown, for example, in FIGS. 3, 4, 12, and 13, a cross-traffic position wherein the deck 60 is substantially aligned with the loading surface 26 of the loading dock 20, as shown, for example, in FIGS. 1, 2, and 11, and a below dock level position wherein the front header 62 of the deck 60 is inclined downwardly beneath the loading surface 26 of the loading dock 20, as shown, for example, in FIGS. 7 and 16. While the deck actuator 68 of the illustrated embodiment is in the form of a hydraulic cylinder, those skilled in the art will readily appreciate that the deck actuator 68 may alternatively take other forms including, but not limited to, spring(s), air bag(s), linear actuator(s) such as screw-drive (s), or the like, without departing from the scope or spirit of the present invention.

In order to span the gap 98 between the deck 60 of the dock leveler 50 and the rear end 94 of the parked vehicle 90, the dock leveler 50 also includes a lip 70 which is pivotally attached to the front header 62 of the deck 60. A lip actuator, such as hydraulic cylinder 78 or the like, may be mounted between the underside surface of the lip 70 and the underside surface of the deck 60 to move the lip 70 between a pendant position and an extended position. In the pendant position, the lip 70 is inclined downwardly in a substantially perpendicular manner with respect to the deck 60, as indicated, for example, in solid lines in FIGS. 3 and 12. In the extended position, conversely, the lip 70 extends outwardly from the front header 62 in a substantially parallel manner with respect to the deck 60, as indicated, for example, in phantom lines in FIGS. 3 and 12, and is adapted to rest upon and be supported by the bed 92 of the parked vehicle 90 and to span the gap 98 between the deck 60 of the dock leveler 50 and the rear end 94 of the vehicle 90. While the lip actuator 78 of the illustrated embodiment comprises a hydraulic cylinder, those skilled in the art will readily appreciate that the lip actuator 78 may alternatively comprise other actuator mechanisms without departing from the scope or spirit of the present invention including, for example, a snubbing cable, as disclosed in U.S. Pat. No. 5,323,503 (Springer), a mechanical toggle mechanism, as disclosed in U.S. Pat. No. 5,475,888 (Massey), or any other means for actuating the lip 70. In addition, even though the lip guiding mechanism shown herein is used with a dock leveler 50 having hydraulic lip actuation, the most advantageous environment for the inventive lip guiding mechanism is in a dock leveler 50 that actuates the lip 70 based upon motion of the deck 60, as in Springer and Massey. One skilled in the art will appreciate, however, that the present invention does not depend upon the means used by the dock leveler 50 for actuating the lip 70.

Figure 1:
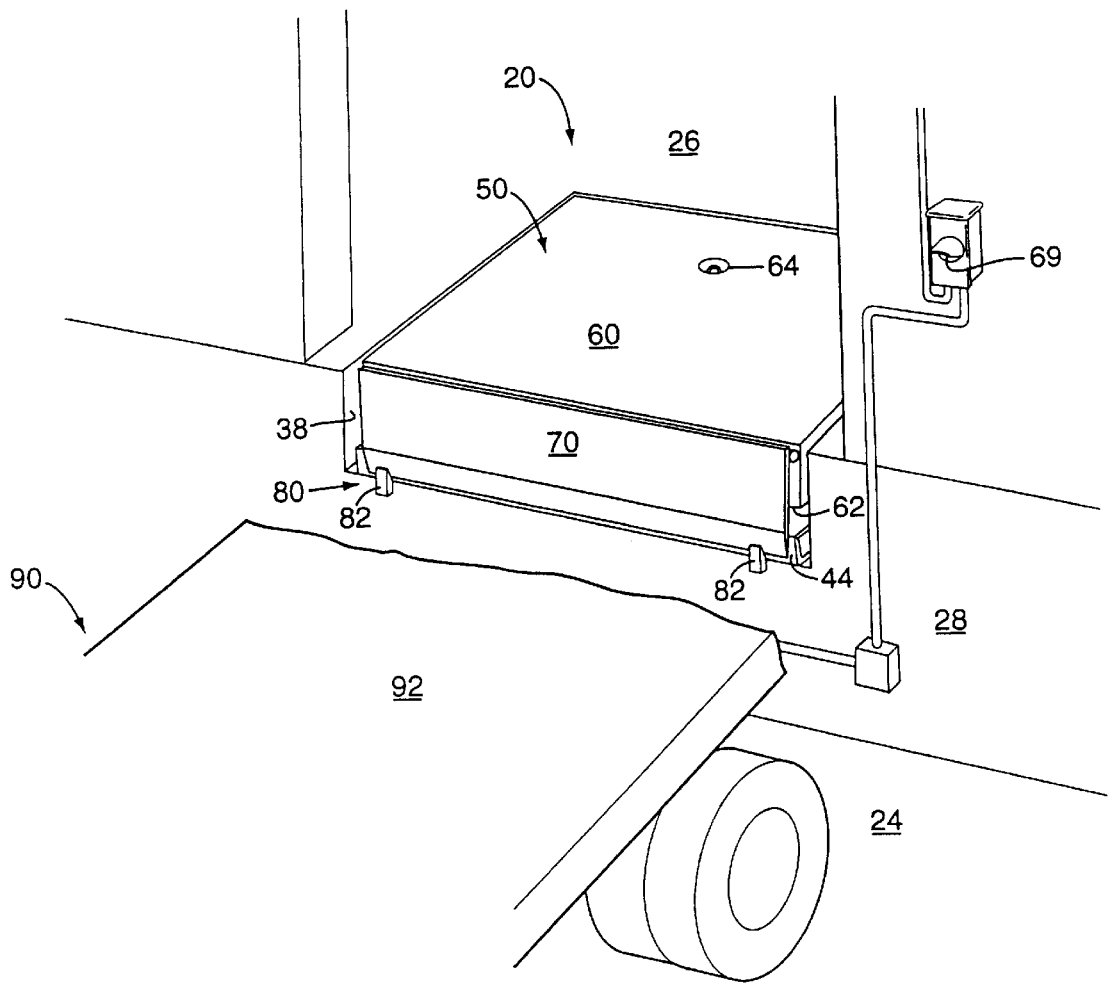
FIG. 1 is a perspective view of a dock leveler having a lip guiding mechanism constructed in accordance with the present invention and showing a deck of the dock leveler in a cross-traffic position, a lip of the dock leveler in a pendant position and received by a lip keeper, and the rear end of a vehicle.
Figure 2:
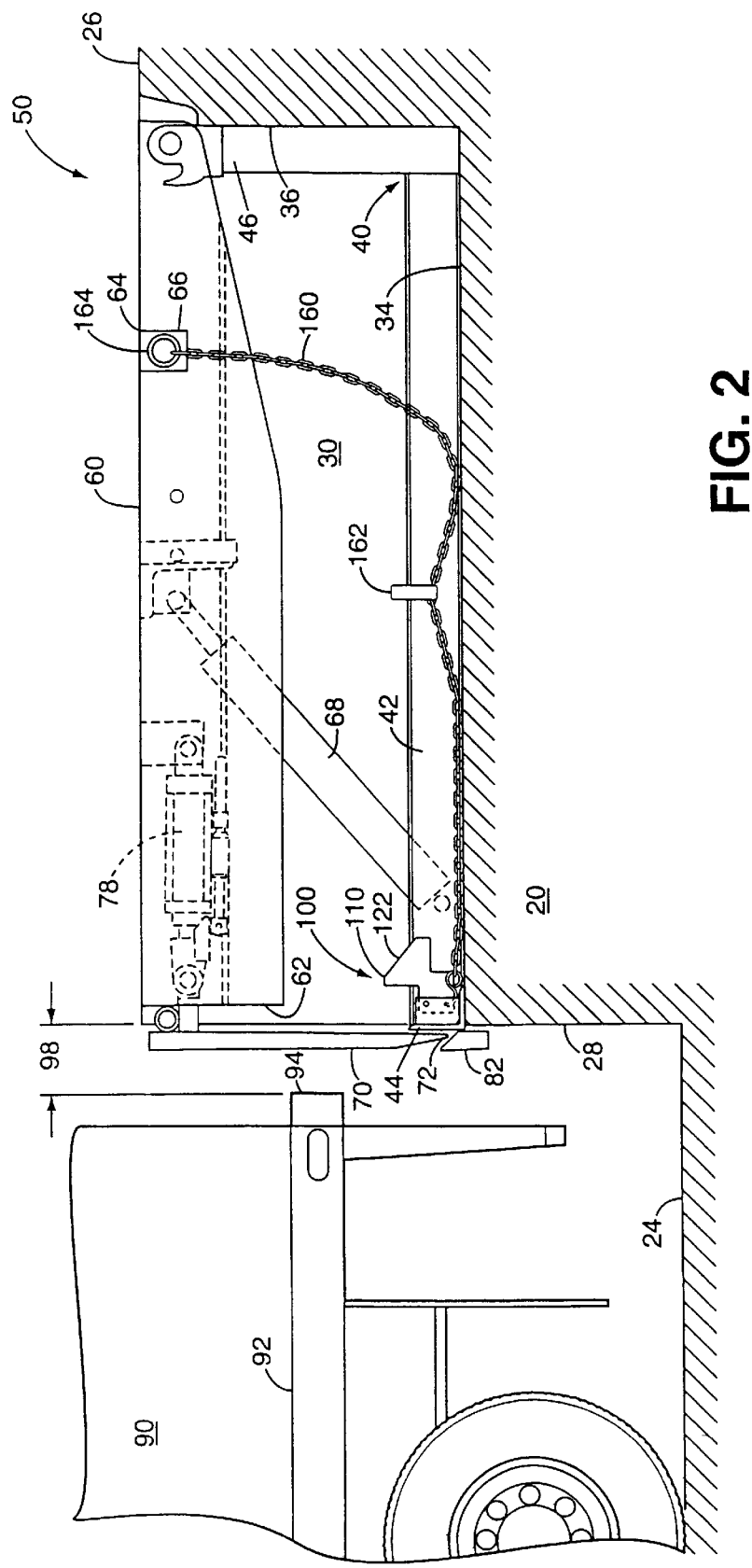
FIG. 2 is a side elevational view of the vehicle, the dock leveler, and the lip cam the mechanism depicted in FIG. 1, showing a lip guide member of the lip guiding mechanism in a stored position.

When the dock leveler 50 is not in use, the deck 60 is normally positioned in the cross-traffic position and the lip 70 is normally positioned in the pendant position, as shown in FIGS. 1, 2, and 11. In order to support the lip 70 and deck 60 during periods of inactivity, the dock leveler 50 is provided with a lip keeper 80 which is mounted to the frame 40. In the illustrated embodiment, the lip keeper 80 includes a pair of spaced-apart lip keeper segments 82 which are mounted to opposed lateral sides of the front section 44 of the frame 40 for selective engagement with the lip 70 of the dock leveler 50. Each lip keeper segment 82 includes a groove or channel portion 84 which is adapted to receive and capture a distal tip portion 72 of the lip 70 while the deck 60 is in the cross-traffic position and the lip 70 is in the pendant position.

In most instances, the deck 60 is moved between the raised, cross-traffic, and below dock level positions to facilitate the loading or unloading of vehicles 90 having beds 92 of dissimilar heights. For example, the deck 60 may be moved into the raised position to facilitate the loading or unloading of a parked vehicle 90 having a bed 92 disposed above the loading surface 26 of the loading dock 20. On the other hand, the deck 60 may be moved into the below dock level position to facilitate the loading or unloading of a parked vehicle 90 having a bed 92 disposed below the loading surface 26 of the loading dock 20, as shown, for example, in FIGS. 1–7 and 11–16.

If the bed 92 of a parked vehicle 90 is disposed below the loading surface 26 of the loading dock 20, the dock leveler 50 may be subjected to a below dock level end-loading condition which involves either removing initial loads from or placing final loads onto the bed 92 of the vehicle 90 while the deck 60 is in the below dock level position. As described more fully above, however, certain problems are associated with below dock level end-loading conditions including, for example, interference between the lip 70 and the lip keepers 80 as the deck 80 is lowered from the raised position toward the below dock level position. In fact, when the lip 70 of a conventional dock leveler is in or near the pendant position, the lip keeper 80 captures the lip 70 as the deck 60 descends toward the cross-traffic position.

Thus, in keeping with an important aspect of the present invention, the first embodiment of the inventive lip guiding mechanism 100 selectively deflects the lip 70 away from the lip keeper 80 to facilitate below dock level end-loading conditions. More specifically, the inventive lip guiding mechanism 100 permits the deck 60 to move below the cross-traffic position and into the below dock level position while the lip 70 is in or near the pendant position.

As best shown in FIGS. 8 and 9, the inventive lip guiding mechanism 100 comprises a lip guide member 110 having a camming portion 120. The lip guide member 110 also may include an opposed counterweight portion 130. In the illustrated embodiment, the camming portion 120 of the lip guide member 110 is provided with a top inclined camming surface 122 and a lower engagement surface 126, and the counterweight portion 130 is provided with an upper engagement surface 132. The lip guide member 110 is mounted within the recess 30 of the loading dock 20 adjacent to the lip keeper 80, and is movable between a stored position and an activated position. In the stored position, the camming surface 122 of the lip guide member 110 is positioned for clearance from the lip 70 of the dock leveler 50, as shown, for example, in FIGS. 1, 2, and 8. In the activated position, conversely, the camming surface 122 of the lip guide member 110 is positioned for engagement by the lip 70 of the dock leveler 50, as shown, for example, in FIGS. 4–7 and 9.

Illustratively, the lip guide member 110 is pivotally attached to the frame 40 of the dock leveler 50 at pivot point 146. Although other positions and arrangements are certainly permissible, in the illustrated embodiment, the lip guide member 110 is located between the two lip keeper segments 82 of the lip keeper 80. The lip guide member 110 is also pivotally attached to the front section 44 of the frame 40 with a mounting structure 140. As best shown in FIG. 10, the mounting structure 140 includes a pair of spaced-apart flanges 142 which are fixedly attached to the front section 44 of the frame 40 in a conventional manner. The mounting structure 140 also includes a retaining pin 144 having a head portion 145 and a shaft portion 146 with a distal threaded end 147. During assembly, the shaft portion 146 of the retaining pin 144 is inserted through aligned holes 143 formed through the two flanges 142 of the mounting structure 140, and through a hole 134 formed through the counterweight portion 130 of the lip guide member 110, until the head portion 145 abuts one of the flanges 142 and the distal threaded end 147 extends outwardly beyond the other flange 142. Thereafter, a fastener, such as an internally threaded nut 149 or the like, is affixed to the distal threaded end 147 of the shaft portion 146 to pivotally attach the lip guide member 110 to both the mounting structure 140 and the front section 44 of the frame 40.

As best shown in FIG. 8, the counterweight portion 130 biases the lip guide member 110 into the stored position by force of gravity. An actuator is also provided for selectively moving the lip guide member 110 between the stored and activated positions. In the illustrated embodiment, the actuator comprises a connective element 160, such as a chain, a cord, cable, or the like. As shown in FIGS. 2 and 8, one end of the connective element 160 is attached to the lip guide member 110 with a clip 161, while the other end of the connective element 160 is inserted through a guide member 162 disposed near the floor 34 of the recess 30 and also through a hole 64 and accompanying notch 66 formed in the deck 60 of the dock leveler 50. When the connective element 160 is pulled into a taut state by exerting a tensile force thereon, the biasing provided by the counterweight portion 130 is overcome and the lip guide member 110 conveniently moves from the stored position, as shown in FIG. 8, toward the activated position, as shown in FIG. 9. In the activated position, the camming surface 122 of the lip guide member 110 is exposed for engagement by the lip 70, and the lower engagement surface 126 of the camming portion 120 may engage the front section 44 of the frame 40. When the connective element 160 is released to eliminate the tensile force thereon and to place the connective element 160 in a slack state, however, the lip guide member 110 returns to the stored position on account of the biasing provided by the counterweight portion 130. While the illustrated actuator for the lip guide member 110 is in the form of a connective element 160, those skilled in the art will readily appreciate that this actuator may alternatively take other forms without departing from the scope or spirit of the present invention including, for example, a motor, a linear actuator, such as a screw-drive, or the like.

In order to prevent the connective element 160 from inadvertently slipping through the hole 64 formed in the deck 60 while slack, a pull ring 164 is attached to the end of the connective element 160. This pull ring 164 is adapted to conveniently fit within and be supported by the notch 64 of the deck 60, as shown, for example, in FIGS. 2, 3, and 7.

When the bed 92 of a parked vehicle 90 is disposed below the loading surface 26 of the loading dock 20, as shown in FIGS. 2–7, the inventive lip guiding mechanism 100 may be utilized to advantageously deflect the lip 70 away from the lip keeper 80 to facilitate below dock level end-loading conditions. In fact, by following a predetermined sequence of events, the pendant or nearly-pendant lip 70 may be advantageously lowered past the lip keeper segments 82 of the lip keeper 80, and into the gap 98 between the deck 60 of the dock leveler 50 and the rear end 94 of the vehicle 90, as the deck 60 descends toward the below dock level position for end-loading purposes.

Figure 3:
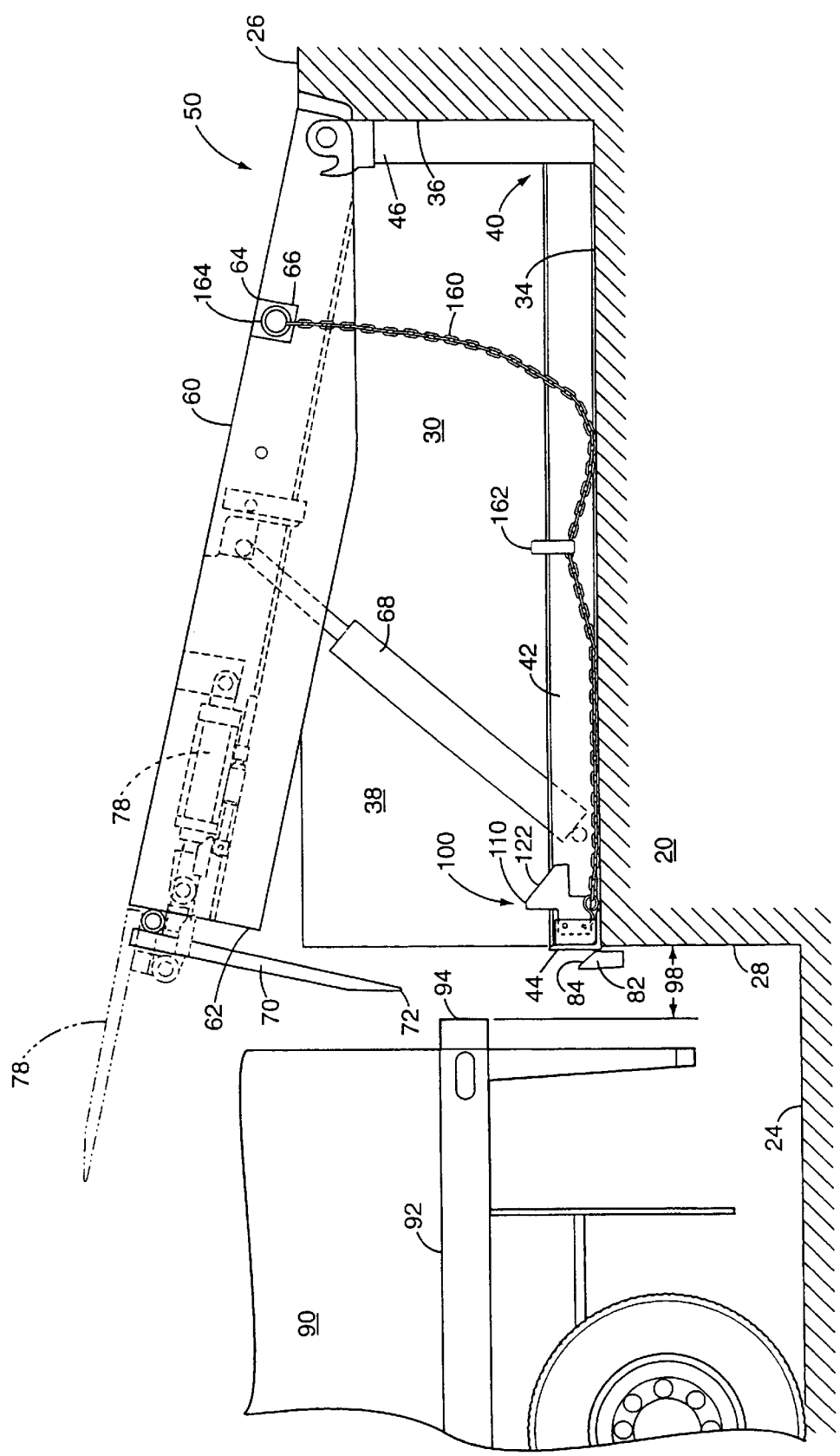
FIG. 3 is a side elevational view of the vehicle, the dock leveler, and the lip guiding mechanism depicted in FIGS. 1 and 2, showing the deck of the dock leveler in a raised position.
Figure 4:
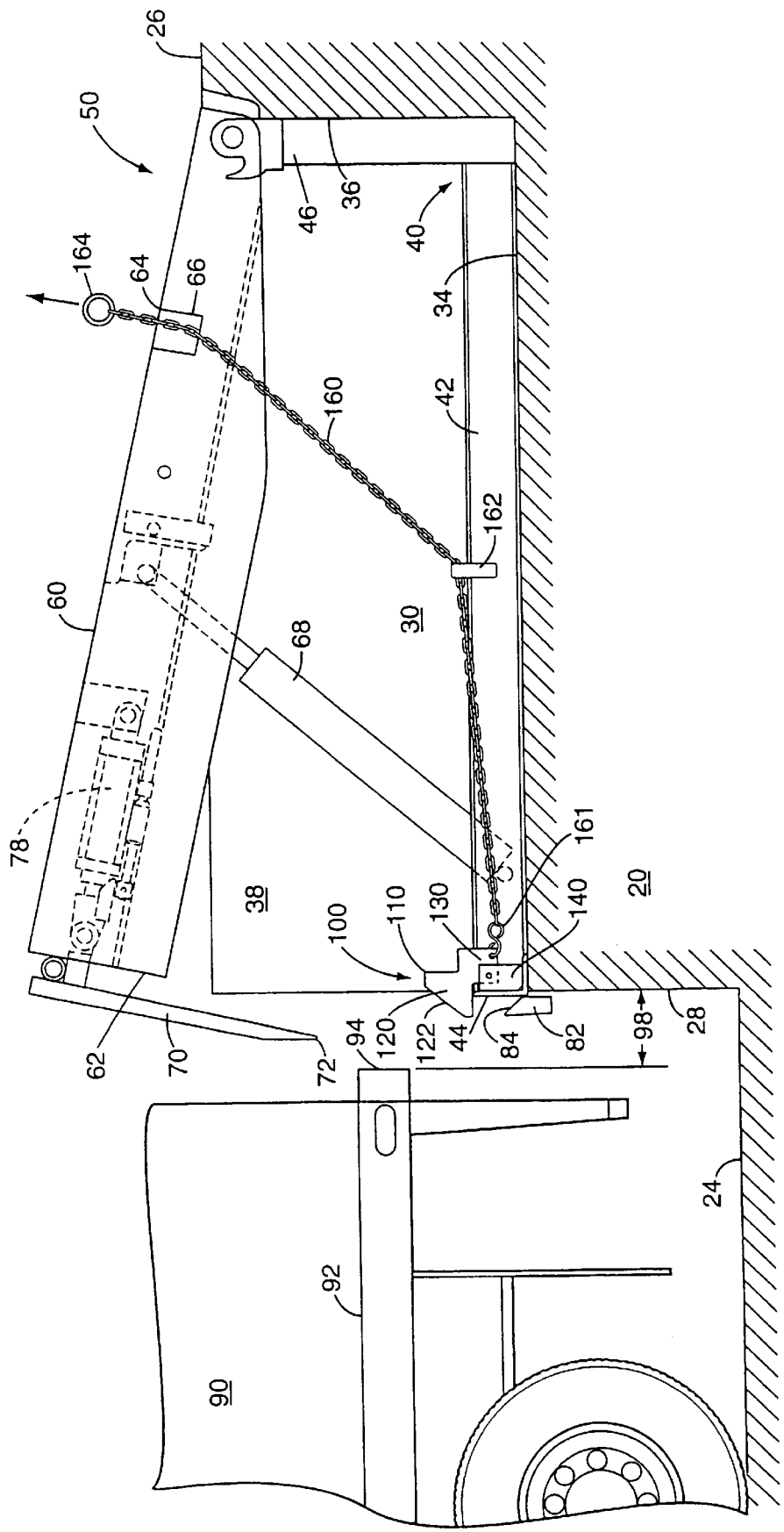
FIG. 4 is a side elevational view of the vehicle, the dock leveler, and the lip guiding mechanism depicted in FIGS. 1–3, showing the deck of the dock leveler in the raised position and the lip guide member of the lip guiding mechanism in an activated position.
Figure 5:
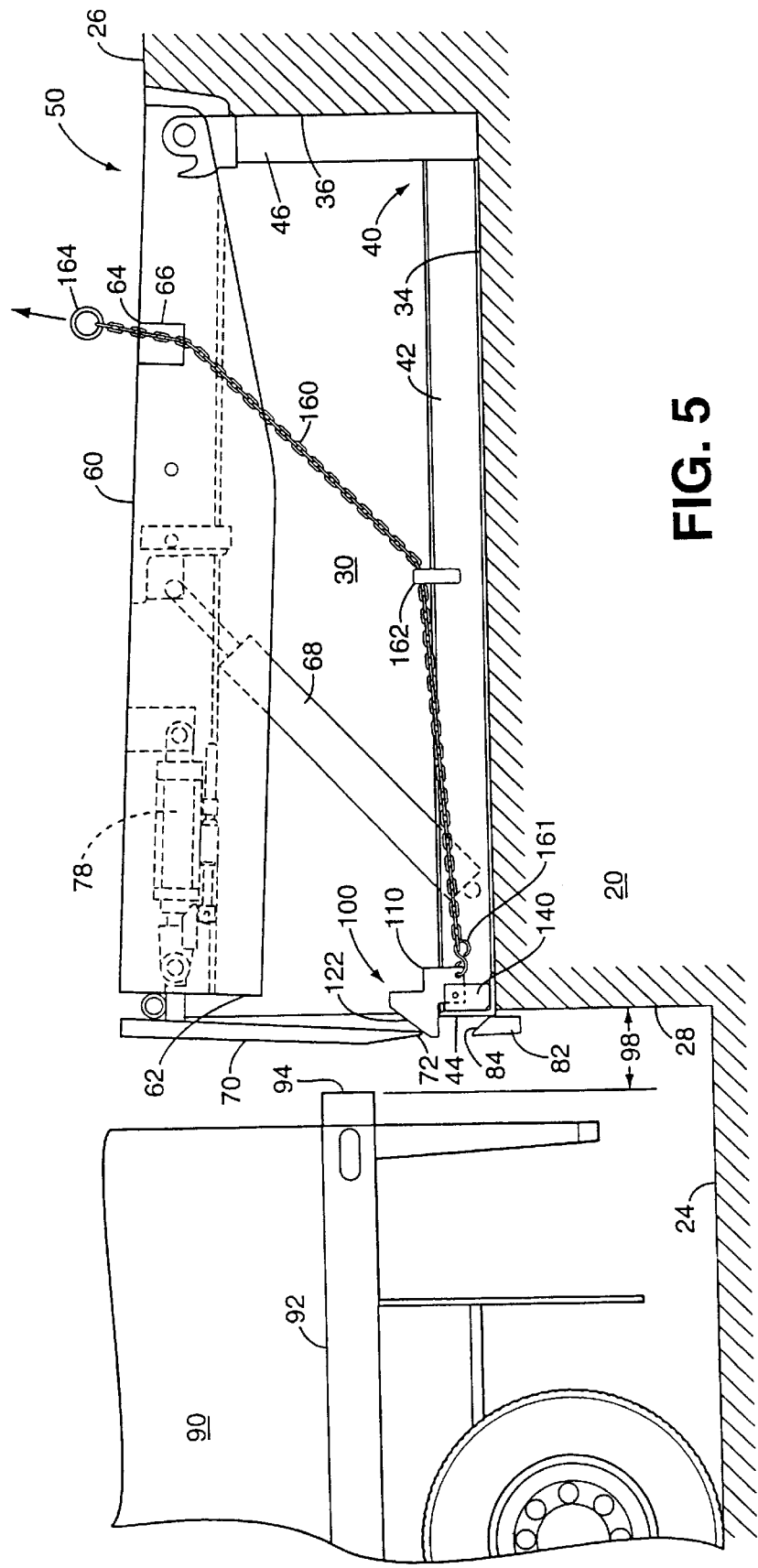
FIGS. 5 and 6 are side elevational views of the vehicle, the dock leveler, and the lip guiding mechanism depicted in FIGS. 1–4, showing the lip guide member of the lip guiding mechanism deflecting the lip of the dock leveler away from the lip keeper as the deck descends from the raised position.
Figure 6:
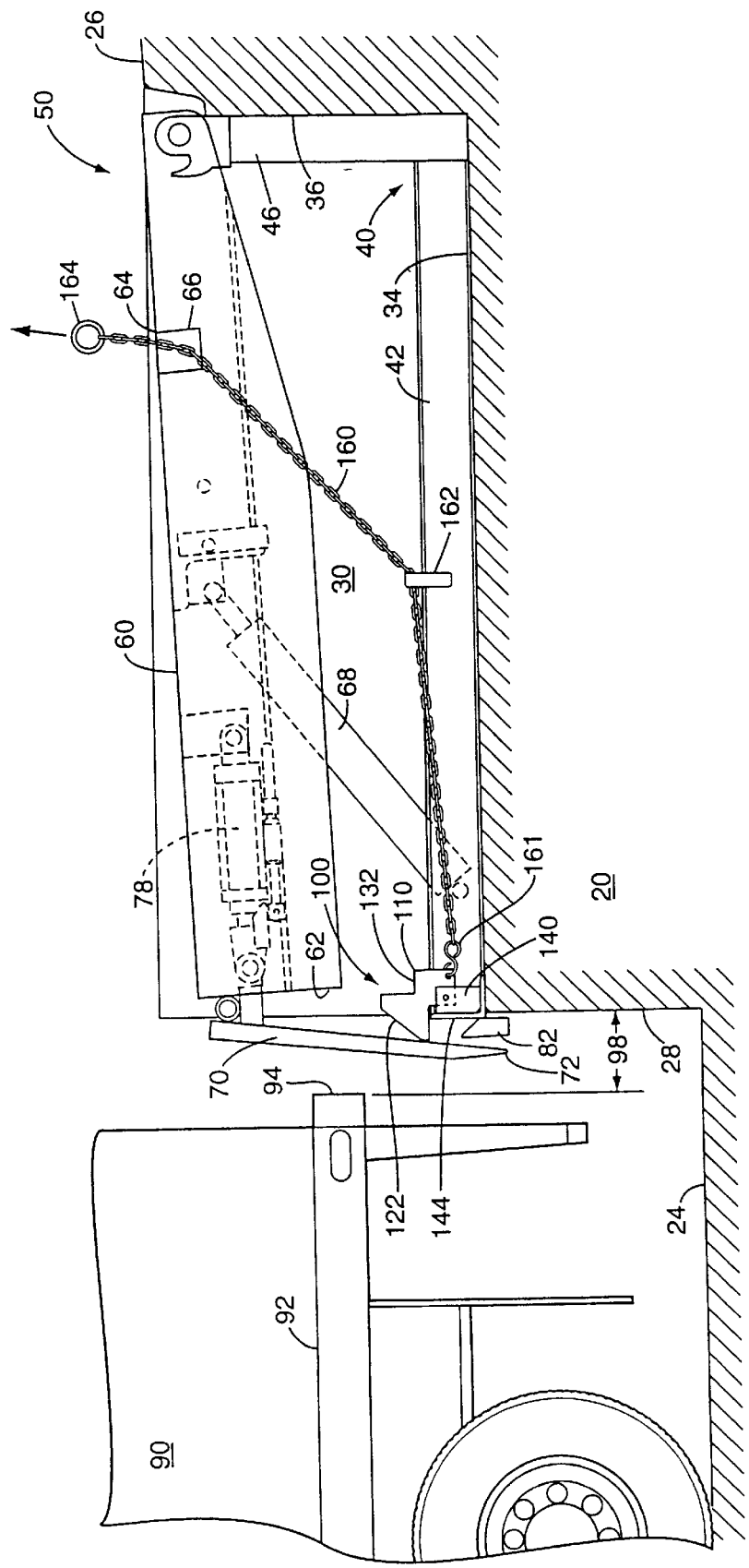
Figure 7:
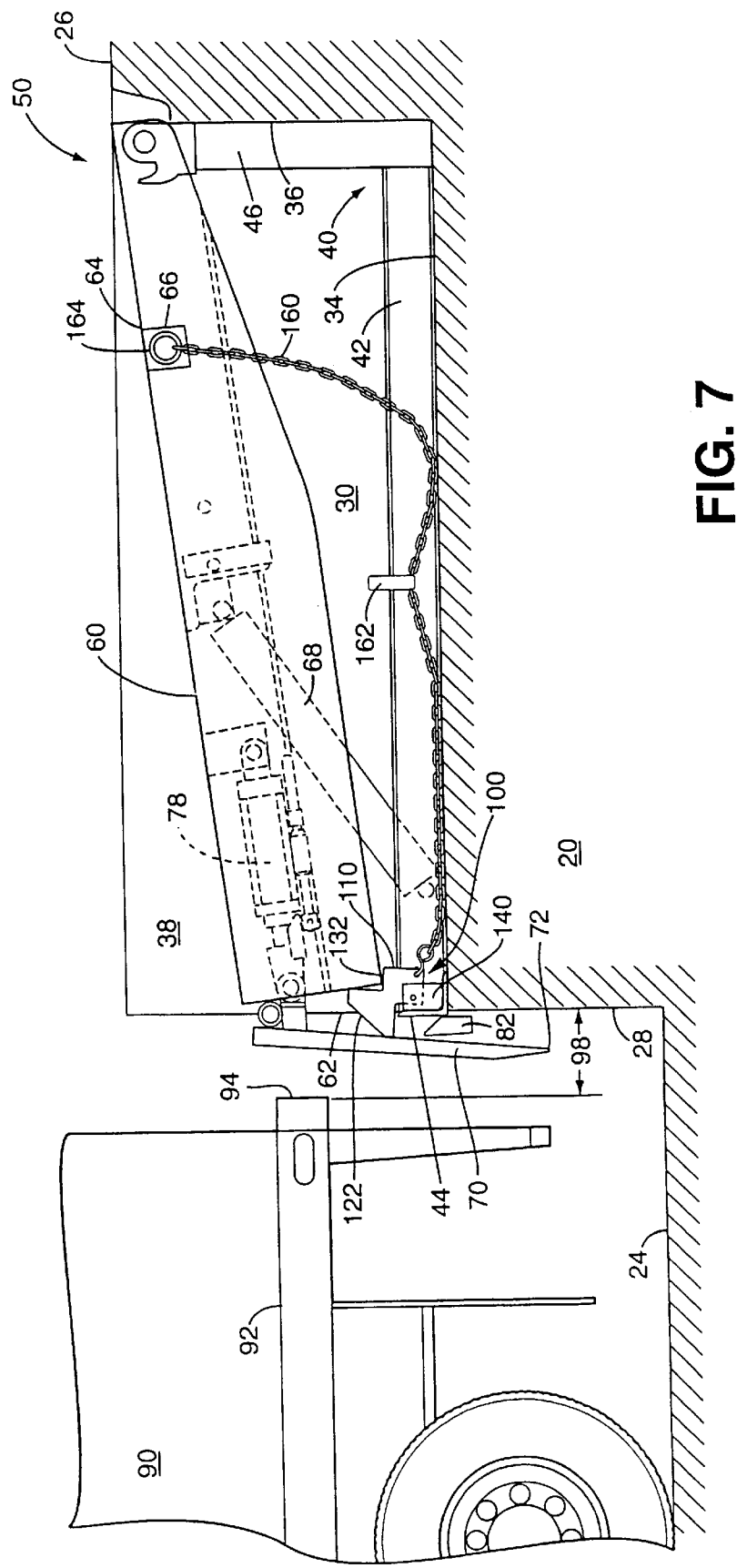
FIG. 7 is a side elevational view of the vehicle, the dock leveler, and the lip guiding mechanism depicted in FIGS. 1–6, showing the deck of the dock leveler in a below dock level end-loading position.

To accomplish this feat, the deck 60 is initially moved from the cross-traffic position, as shown in FIGS. 1 and 2, toward the raised position, as shown in FIG. 3, to withdraw the tip 72 of the lip 70 from the channel portions 84 of the lip keeper segments 82. In some dock leveler systems, the deck 60 may be elevated toward the raised position simply by pushing a deck actuation button 69 for the deck actuator 68, as shown in FIG. 1. Next, a relatively small tensile force is exerted on the connective element 160 to move the lip guide member 110 from the stored position, as shown in FIGS. 3 and 8, to the activated position, as shown in FIGS. 4 and 9. The connective element 160 may be put into a state of tension by simply withdrawing the pull ring 164 from the notch 66 of the deck 60 and by holding the pull ring 164 a sufficient distance away from the deck 60, as shown, for example, in FIG. 4. Once the lip guide member 110 is in the activated position, the deck 60 is then lowered from the raised position toward lower operating positions. As the deck 60 descends from the raised position, the lip 70 is not captured by the lip keeper segments 82 as the deck 60 proceeds past the cross-traffic position. Instead, the activated lip guide member 110 advantageously deflects the lip 70 away from the lip keeper 80 and into the gap 98 between the deck 60 of the dock leveler 50 and the rear end 94 of the vehicle 90. More specifically, as the deck 60 descends from the raised position, as shown in FIG. 4, the tip 72 of the lip 70 is deflected away from the channel portions 84 of the lip keeper segments 82 (and slightly away from the pendant position) by engagement with the camming surface 122 of the activated lip guide member 110, as shown in FIGS. 5 and 6, which permits the deck 60 to move into the below dock level position, as shown, for example, in FIG. 7, for end-loading purposes. Once the deck 60 reaches the below dock level position, the pull ring 164 of the connective element 160 may be released without the lip guide member 110 reverting to the stored position because the camming portion 120 of the lip guide member 110 is captured between the lip 70 and the front header 62 of the deck 60, as shown in FIG. 7.

Unlike prior art dock levelers, which require either a significant force or a sensitive trigger-finger to move the lip away from lip keeper as the deck descends toward the below dock level position for end-loading, the inventive lip guiding mechanism 100 requires a relatively low tensile force on the connective element 160 to deflect the lip 70 away from lip keeper 80. As such, the inventive lip guiding mechanism 100 is easy and reliable to operate. The lip guiding mechanism 100 also prevents interference between the lip 70 of the dock leveler 50 and any cargo, freight, or other material disposed at the rear end 94 of the parked vehicle 90 during below dock level end-loading conditions.

Like the first embodiment of the lip guiding mechanism 100, the second embodiment of the inventive lip guiding mechanism 200 selectively deflects the lip 70 of the dock leveler 50 away from the lip keeper 80 to facilitate below dock level end-loading conditions. In particular, the inventive lip guiding mechanism 200 permits the deck 60 to move below the cross-traffic position and into the below dock level position while the lip 70 is in or near the pendant position. As best shown in FIGS. 17–19, the second embodiment of the lip guiding mechanism 200 comprises a lip guide member 210 having a camming portion 220, an opposed counterweight portion 230, and a sleeve portion 236 which extends transversely through the camming portion 220. In addition, the camming portion 220 of the lip guide member 210 also includes a pair of inclined camming surfaces 222 and 224.

The lip guide member 210 is mounted within the recess 30 of the loading dock 20 adjacent to the lip keeper 80, and is movable between stored and activated positions. In the stored position, the camming surfaces 222 and 224 of the lip guide member 210 are positioned for clearance from the lip 70 of the dock leveler 50, as shown, for example, in FIGS. 11, 12, and 15–17. In the activated position, conversely, the camming surfaces 222 and 224 of the lip guide member 210 are positioned for engagement by the lip 70 of the dock leveler 50, as shown, for example, in FIGS. 13, 14, and 18.

In the illustrated embodiment, the lip guide member 210 is pivotally attached to the front section 44 of the frame 40 with a mounting structure 240. More specifically, the mounting structure 240 includes a pair of spaced-apart flanges 242 which are fixedly attached to the front section 44 of the frame 40 in a conventional manner, and are coupled by a transversely extending cross-member 243. The mounting structure 240 also includes a retaining pin 244 having a head portion 245 and a shaft portion 246 with a distal end 247.

During assembly, the shaft portion 246 of the retaining pin 244 is inserted through aligned holes formed in the two flanges 242 of the mounting structure 240 and through the sleeve portion 236 of the lip guide member 210 to pivotally attached the lip guide member 210 to both the mounting structure 240 and the front section 44 of the frame 40. As best shown in FIG. 19, the retaining pin 244 is pivotally maintained between the two flanges 242 of the mounting structure 240 by a coupling, such as a deformable cotter pin 249 or the like, which is fastened to the distal end 247 of the shaft portion 248 in proximity to one of the flanges 242 while the head portion 245 of the retaining pin 244 engages the other flange 242.

As best shown in FIG. 17, the counterweight portion 230 biases the lip guide member 210 into the stored position by force of gravity. An actuator is also provided for selectively moving the lip guide member 210 between the stored and activated positions. In the illustrated embodiment, the actuator comprises a connective element 260, such as a chain, a cord, cable, or the like. As shown in FIGS. 11 and 17, one end of the connective element 260 is attached to the lip guide member 210 with a ring 261, and the other end of the connective element 260 is inserted between the sleeve portion 236 of the lip guide member 210 and the cross-member 243 of the mounting structure 240, through a guide member 262 disposed near the floor 34 of the recess 30, and through the hole 64 and accompanying notch 66 formed in the deck 60 of the dock leveler 50. As in the first embodiment, a pull ring 264 is provided at the end of the connective element 260 to prevent the connective element 260 from accidentally slipping through the hole 64 of the deck 60.

When the connective element 260 is pulled into a taut state by exerting a relatively small tensile force thereon, the biasing provided by the counterweight portion 230 is overcome and the lip guide member 210 moves from the stored position, as shown in FIG. 17, toward the activated position, as shown in FIG. 18. In the activated position, the camming surfaces 222 and 224 of the lip guide member 210 are exposed for engagement by the tip 72 of the lip 70. When the connective element 260 is released to eliminate the tensile force thereon and to place the connective element 260 in a slack state, however, the lip guide member 210 returns to the stored position on account of the biasing provided by the counterweight portion 230. While the illustrated actuator for lip guide member 210 is in the form a connective element 260, those skilled in the art will readily appreciate that this actuator may take other forms including, for example, a motor, a linear actuator, such as a screw-drive, or the like, without departing from the scope or spirit of the present invention.

When the bed 92 of the parked vehicle 90 is disposed below the loading surface 26 of the loading dock 20, as shown in FIGS. 11–16, the second embodiment of the inventive lip guiding mechanism 200 may be used to advantageously deflect the lip 70 away from the lip keeper 80 to facilitate below dock level end-loading conditions. More specifically, the pendant or nearly-pendant lip 70 may be lowered past the lip keeper segments 82 of the lip keeper 80, and through the gap 98 between the deck 60 of the dock leveler 50 and the rear end 94 of the vehicle 90, while the deck 60 descends toward the below dock level position for end-loading purposes.

Figure 12:
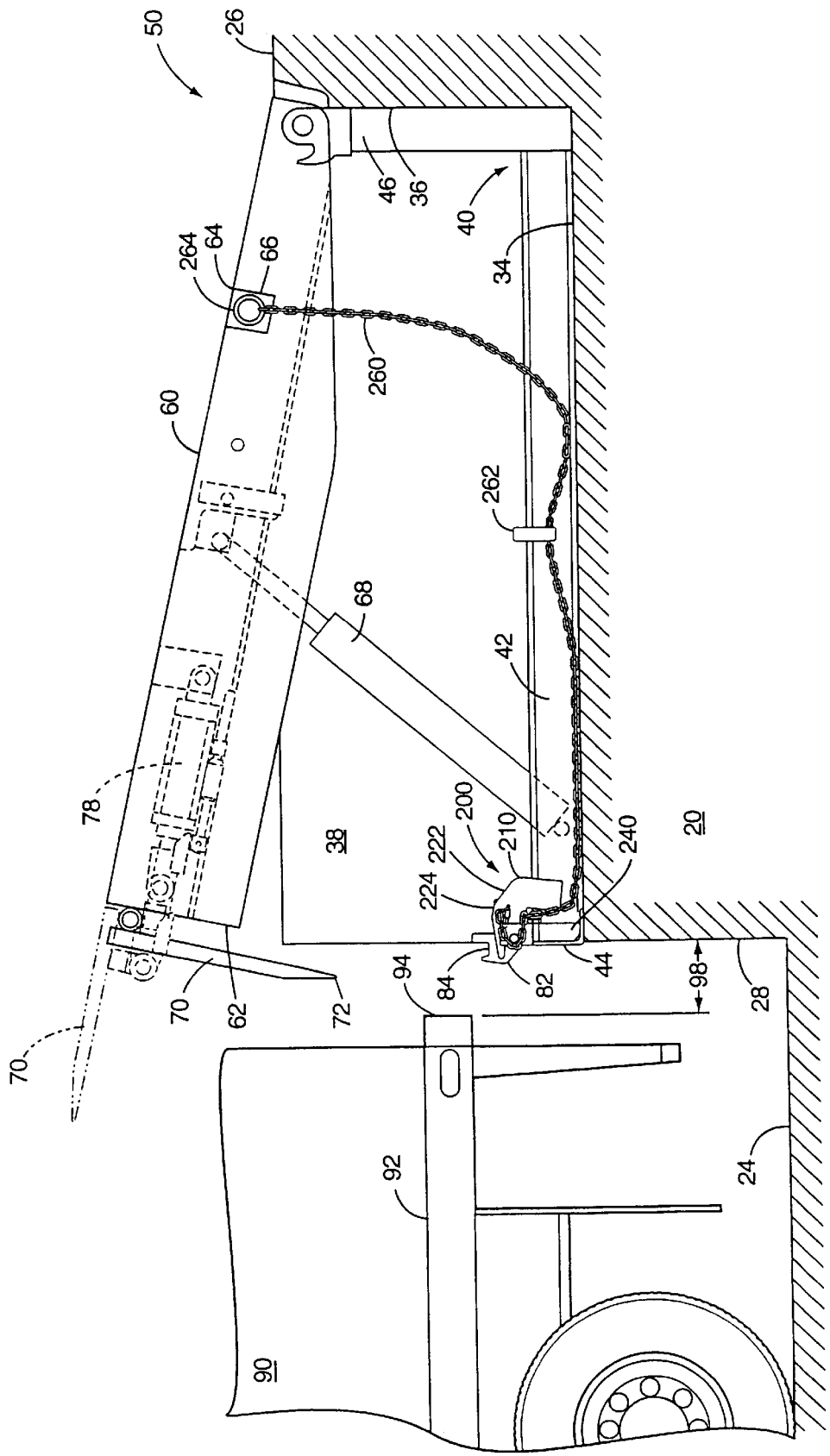
FIG. 12 is a side elevational view of the vehicle, the dock leveler, and the lip guiding mechanism depicted in FIG. 11, showing the deck of the dock leveler in a raised position.

To this end, the deck 60 is initially moved from the cross-traffic position, as shown in FIG. 11, toward the raised position, as shown in FIGS. 12 and 13, to withdraw the tip 72 of the lip 70 from the channel portions 84 of the lip keeper segments 82. Next, the pull ring 264 of the connective element 260 is withdrawn from the notch 66 of the deck 60 and a relatively small tensile force is exerted on the connective element 260 which causes the lip guide member 210 to move from the stored position, as shown in FIGS. 12 and 17, to the activated position, as shown in FIGS. 13 and 18. Once the lip guide member 210 is in the activated position, the deck 60 is then lowered from the raised position toward the below dock level position. As the deck 60 descends from the raised position, the activated lip guide member 210 advantageously deflects the tip 72 of the lip 70 away from the lip keeper segments 82 and into the gap 98 between the deck 60 of the dock leveler 50 and the rear end 94 of the vehicle 90. More specifically, the lip 70 engages at least one of the camming surfaces 222 and 224 of the activated lip guide member 210, as shown in FIGS. 14 and 15, which causes the lip 70 to deflect away from the channel portions 84 of the lip keeper segments 82 (and slightly away from the pendant position). Once the lip 70 has been deflected away from the lip keeper segments 82, the pull ring 264 of the connective element 260 may be released, as shown in FIG. 15, which causes the lip guide member 210 to return to the stored position. Thereafter, the deck 60 is free to move into the below dock level position, as shown, for example, in FIG. 16, for end-loading purposes.

Unlike prior art dock levelers, which require either a significant force or a sensitive trigger-finger to move the lip away from lip keeper as the deck descends toward the below dock level position for end-loading, the inventive lip guiding mechanism 200 requires a relatively low tensile force on the connective element 260 to deflect the lip 70 away from lip keeper 80. As such, the inventive lip guiding mechanism 200 is easy and reliable to operate. The lip guiding mechanism 200 also prevents interference between the lip 70 of the dock leveler 50 and any cargo, freight, or other material disposed at the rear end 94 of the parked vehicle 90 during below dock level end-loading conditions.

While the present invention has been disclosed in connection with two illustrated embodiments, it will be understood, of course, that there is no intention to limit the invention to the disclosed structural forms. On the contrary, the intention is to cover to cover all modifications, alternative constructions, and equivalents that fall within the scope and spirit of the present invention as defined by the following claims.

What is claimed is:

1. For use with a loading dock and a dock leveler, the dock leveler having a movable deck and a pivotally movable lip, a lip guiding mechanism comprising:

a lip guide member having at least one camming surface, the lip guide member being disposed adjacent to the loading dock for movement between a stored position and an activated position, said at least one camming surface being positioned for clearance from the lip of the dock leveler when the lip guide member is in the stored position, said at least one camming surface being positioned for engagement by the lip of the dock leveler when the lip guide member is in the activated position, wherein, when the lip guide member is in the activated position, said at least one camming surface of the lip guide member is positioned to deflect the lip of the dock leveler in a direction away from a rear of the dock leveler as the deck of the dock leveler descends from a raised position toward a below dock level position, the lip guide member being mounted independent of the deck such that moving the deck between the raised position and the below dock level position does not move the lip guide member, the lip guide member including a counterweight portion which biases the lip guide member toward the stored position by force of gravity; and an actuator coupled to the lip guide member for selectively moving the lip guide member between the stored and activated positions.

2. The lip guiding mechanism set forth in claim 1, wherein the lip guide member is mountable on a frame for the dock leveler.

3. The lip guiding mechanism set forth in claim 1, wherein the lip guide member is pivotally mountable to the loading dock.

4. The lip guiding mechanism set forth in claim 1, wherein the actuator comprises a connective element, and the lip guide member is movable into the activated position by exerting a tensile force on the connective element.

5. The lip guiding mechanism set forth in claim 4, wherein the connective element comprises a chain.

6. The lip guiding mechanism set forth in claim 4, wherein the connective element includes a pull ring.

7. A dock leveler associated with a loading dock comprising:

a lip guide member having at least one camming surface, the lip guide member being disposed adjacent to the loading dock for movement between a stored position and an activated position, said at least one camming surface being positioned for clearance from a pivotally movable lip of the dock leveler when the lip guide member is in the stored position, said at least one camming surface being positioned for engagement by the lip of the dock leveler when the lip guide member is in the activated position, wherein, when the lip guide member is in the activated position, said at least one camming surface of the lip guide member is positioned to deflect the lip of the dock leveler away from a rear of the dock leveler as a deck of the dock leveler descends from a raised position toward a below dock level position, the lip guide member being mounted independent of the deck such that moving the deck between the raised position and the below dock level position does not move the lip guide member, the lip guide member including a counterweight portion which biases the lip guide member toward the stored position by force of gravity.

8. The lip guiding mechanism set forth in claim 2, further comprising:

an actuator coupled to the lip guide member for selectively moving the lip guide member between the stored and activated positions.

9. The dock leveler set forth in claim 8, wherein the actuator comprises a connective element, and the lip guide member is movable into the activated position by exerting a tensile force on the connective element.

10. A method of moving a dock leveler from a position in which a pivotally mounted deck of the dock leveler is in a cross-traffic position to a position in which the deck of the dock leveler is in a below dock level position, the dock leveler having a lip with a distal edge, the method comprising the steps of:

moving the deck of the dock leveler from the cross-traffic position toward a raised position;

moving a lip guide member from a stored position to an activated position to expose a cam surface of the lip guide member to the distal edge of the lip; and lowering the deck of the dock leveler from the raised position toward the below dock level position such that the distal edge of the lip strikes the exposed cam surface of the activated lip guide member and the lip of the dock leveler deflects away from the a rear of the dock leveler.

11. For use with a loading dock and a dock leveler, the dock leveler having a movable deck and a pivotally movable lip, a lip guiding mechanism comprising:

a lip guide member having at least one camming surface, the lip guide member being disposed adjacent to the loading dock for movement between a stored position and an activated position, said at least one camming surface being positioned for clearance from the lip of the dock leveler when the lip guide member is in the stored position, said at least one camming surface being positioned for engagement by the lip of the dock leveler when the lip guide member is in the activated position, wherein, when the lip guide member is in the activated position, said at least one camming surface of the lip guide member is positioned to deflect the lip of the dock leveler away from a rear of the dock leveler as the deck of the dock leveler descends from a raised position toward a below dock level position, the lip guide member having a counterweight portion which biases the lip guide member toward the stored position by force of gravity.

12. A mechanism as set forth in claim 11 further comprising an actuator coupled to the lip guide member for selectively moving the lip guide member between the stored and activated positions.

13. For use with a loading dock and a dock leveler, the dock leveler having a movable deck and a pivotally movable lip, a lip guiding mechanism comprising:

a lip guide member having at least one camming surface, the lip guide member being disposed adjacent to the loading dock for movement between a stored position and an activated position, said at least one camming surface being positioned for clearance from the lip of the dock leveler when the lip guide member is in the stored position, said at least one camming surface being positioned for engagement by the lip of the dock leveler when the lip guide member is in the activated position, wherein, when the lip guide member is in the activated position, said at least one camming surface of the lip guide member is positioned to deflect the lip of the dock leveler away from a rear of the dock leveler as the deck of the dock leveler descends from a raised position toward a below dock level position; and an actuator coupled to the lip guide member for selectively moving the lip guide member between the stored and activated positions, the actuator and the lip guide member being coupled such that, actuation of the actuator applies a force to the lip guide member in a first direction to thereby cause a camming portion of the lip guide member to move in a second direction opposite the first direction.

14. For use with a loading dock and a dock leveler, the dock leveler having a movable deck and a pivotally movable lip, a lip guiding mechanism comprising:

a lip guide member having at least one camming surface, the lip guide member being disposed adjacent to the loading dock for movement between a stored position and an activated position, said at least one camming surface being positioned for clearance from the lip of the dock leveler when the lip guide member is in the stored position, said at least one camming surface being positioned for engagement by the lip of the dock leveler when the lip guide member is in the activated position, wherein, when the lip guide member is in the activated position, said at least one camming surface of the lip guide member is positioned to deflect the lip of the dock leveler away from a rear of the dock leveler as a force causes the deck of the dock leveler to descend from a raised position toward a below dock level position, wherein the deflection of the lip away from the rear of the dock leveler is caused by the force moving the deck of the dock leveler from the raised position to the below dock position.

* * * * *